United States Patent
Schultz et al.

(10) Patent No.: US 9,441,859 B2
(45) Date of Patent: Sep. 13, 2016

(54) PORTABLE OPEN-LOOP WELLWATER SOURCE HEAT PUMP FOR STANDALONE AND DUCT-CONNECTED INSTALLATION

(71) Applicant: Terra Caloric, LLC, Alpena, MI (US)

(72) Inventors: Dennis A. Schultz, Alpena, MI (US); Michael G. Dilling, Warsaw, IN (US)

(73) Assignee: Terra Caloric, LLC, Alpena, MI (US)

( * ) Notice: Subject to any disclaimer, the term of this patent is extended or adjusted under 35 U.S.C. 154(b) by 766 days.

(21) Appl. No.: 13/789,249

(22) Filed: Mar. 7, 2013

(65) Prior Publication Data

US 2013/0233509 A1    Sep. 12, 2013

Related U.S. Application Data

(60) Provisional application No. 61/608,304, filed on Mar. 8, 2012, provisional application No. 61/756,594, filed on Jan. 25, 2013.

(51) Int. Cl.
| | |
|---|---|
| *F24J 3/08* | (2006.01) |
| *F24H 1/06* | (2006.01) |
| *F24H 4/02* | (2006.01) |
| *F25B 30/02* | (2006.01) |

(52) U.S. Cl.
CPC . *F24J 3/08* (2013.01); *F24H 1/06* (2013.01); *F24H 4/02* (2013.01); *F25B 30/02* (2013.01); *F24D 2200/11* (2013.01); *Y02B 10/40* (2013.01); *Y02B 30/12* (2013.01); *Y02E 10/10* (2013.01)

(58) Field of Classification Search
CPC ............. F24J 2003/088; F24J 2003/087; F24J 2003/089; F24F 5/005; F24F 2005/0053; F24F 2005/0057; F24F 2005/006; F24F 5/0046; F24F 1/04; F24F 1/025
See application file for complete search history.

(56) References Cited

U.S. PATENT DOCUMENTS

| | | | |
|---|---|---|---|
| 2,165,854 A | * | 7/1939 | Headrick .............. F24F 5/0046 165/121 |
| 4,216,660 A | | 8/1980 | Rodgers |
| 4,382,368 A | | 5/1983 | Dittell |
| 5,183,100 A | | 2/1993 | Harrell, Jr. |
| 5,606,865 A | * | 3/1997 | Caron .................... F24F 1/025 165/45 |
| 6,688,129 B2 | | 2/2004 | Ace |
| 7,597,138 B1 | | 10/2009 | Koenig |
| 7,827,814 B2 | | 11/2010 | Slater |

OTHER PUBLICATIONS

Azocleantech, Portable Geothermal Heat Pumps from American Geothermal, www.azocleantech.com/news.aspx?newsID=7111, Nov. 25, 2009, 2pages, Azocleantech, U.S.

* cited by examiner

*Primary Examiner* — Cassey D Bauer
(74) *Attorney, Agent, or Firm* — Northern Michigan Patent Law, PLC (57) ABSTRACT

A portable, open-loop, water source geothermal heat pump unit adapted to be connected with non-permanent, non-plumbed connections to convenient water supply/discharge points such as multi-use faucets and drains in a home supplied with well water. The unit is further adapted to be supplied with power from an electrical outlet using a simple plug-in cord. The heat pump unit may be installed independently of any existing furnace system, for direct or "space" heating of a room from which it draws intake air and directly vents heated air. The heat pump unit may also be ducted to heat another room from the one in which it is installed, and may further be ducted in parallel to an existing furnace ductwork for a duct-connected heating combination with the furnace.

5 Claims, 11 Drawing Sheets

PORTABLE OPEN-LOOP WELLWATER SOURCE HEAT PUMP FOR STANDALONE AND DUCT-CONNECTED INSTALLATION

RELATED APPLICATIONS/PRIORITY BENEFIT CLAIM

This application claims the benefit of U.S. Provisional Application No. 61/608,304 filed Mar. 8, 2012 (Schultz and Dilling), and U.S. Provisional Application No. 61/756,594 filed Jan. 25, 2013 (Schultz), the entireties of which provisional applications are hereby incorporated by reference.

FIELD

The subject matter of the present application is in the field of groundwater-based geothermal heating and cooling units, commonly referred to as geothermal heat pumps, which transfer heat energy to and from groundwater from wells for the purpose of cooling or heating building interiors.

BACKGROUND

Geothermal water source heat pump systems are well known, in which a heat pump unit receives ground water and extracts heat energy from the water via a refrigerant in an evaporation/compression/expansion cycle. In the typical HVAC system for a building interior, a geothermal heating system will often include a refrigerant reversing valve and reversible condensers and evaporators, so that the direction of heat flow may be reversed to transfer building interior heat into the groundwater for cooling, depending on the occupant requirements.

There are two basic types of geothermal heating systems using the heat from the ground: closed-loop and open-loop.

In closed-loop systems, the heat exchange fluid is often an antifreeze solution circulated through a closed loop—usually made of plastic tubing—that is buried in the ground or submerged in water (such as an aquifer, well, or pond). A heat exchanger transfers heat between the refrigerant in the heat pump and the antifreeze solution in the closed loop. The loop can be in a horizontal, vertical, or pond/lake configuration.

Open-loop groundwater source systems use well or surface body water as the heat exchange fluid that circulates through the system. Once it has circulated through the system, the water returns to the ground through the well or surface discharge. This option is available wherever there is a supply of relatively clean water. In rural locations where homes and businesses rely on well water, this is often the preferred, less expensive, more efficient system.

Traditional geothermal heating units are relatively large, fixture type installations, intended for whole-house heating and married to the houses that they heat, with permanent installations of underground heat exchange loops (in closed-loop systems), hardwired connections to building electrical power, and permanent plumbing and duct connections to furnace blowers and radiators. In closed-loop systems, the in-ground installation of heat exchange coils and loops can be prohibitively expensive. Conventional open-loop systems may use more water than an existing well can supply.

Additionally, geothermal systems are often used as primary heating, plumbed in series with an existing fossil fuel furnace for additional capacity. Such systems typically require shutting one of the geothermal and fossil systems off when the other is running.

BRIEF SUMMARY

We have invented a geothermal heating unit and system in which the geothermal heat pump unit is small and portable, intended for open space or primary occupied space heating ("room" heating) rather than whole-house heating. Another aspect of our invention is a non-permanent duct-connected installation of the portable geothermal heat pump to an existing home heating system such as a gas forced-air furnace.

In a first embodiment of the geothermal heat pump unit, the geothermal heat pump is a portable, efficient, energy-saving, self-contained, open-loop water source heat pump that provides or removes energy for space heating and cooling directly to the space (e.g., a room) being heated. The unit is designed to utilize an existing well water source and home power supply to operate from anywhere in a building, including the main living or working area. The unit may serve as the primary heating and cooling system for one or more rooms in a typical residence or small facility, with any existing heating and cooling system (e.g., gas forced-air furnace) serving a supplemental role. All systems and controls necessary for operation of the unit are built into a stand-alone cabinet that allows the end user to simply connect the unit to a multi-use home water source, plug it in to an appropriate home electrical outlet, and turn it on without the need for a contractor or professional services.

In further detail, the portable geothermal heat pump unit comprises a heat pump in a portable cabinet, with a water supply inlet accessible from the exterior of the cabinet for receiving water from the existing home groundwater supply (e.g., a spigot or faucet connected to a well) through a suitable non-plumbed water supply means such as a hose or removable tube; a water discharge outlet accessible from the exterior of the cabinet for discharging water from which heat energy has been extracted or added to a drain, sink, sump or other open discharge point in communication with an outside discharge location, also through a non-plumbed connector such as a hose or tube; and an electrical plug for connection to an existing home electrical outlet.

In further detail, the portable cabinet may be wheeled, for example on casters, and sized to fit through typical home doorways. The cabinet transfers or removes heat energy to and from the space being heated or cooled by means contained in the cabinet and powered by the electrical plug supply, for example a blower or radiator in the cabinet.

In a second aspect of the invention, the portable geothermal heat pump unit is connected in a duct-connected installation to ductwork in the home to heat a different room. In one form the duct-connected configuration combines the heat pump unit in operative parallel with an existing forced-air type home heating system having its own air distribution ductwork, and which the original home heating system may or may not include provisions to provide cooling. The portable geothermal heat pump unit may be connected to home heating system ductwork as the first stage of heating or cooling, only relying on an existing conventional forced-air furnace system as a second stage backup during conditions in which the geothermal unit alone does not provide sufficient capacity to meet the conditioning load. By connecting and operating the geothermal unit in ducted parallel with (as opposed to in series with) the conventional furnace system, it is possible to run both at the same time. This provides greater overall system efficiency (and conditioning capacity) than a typical prior system in which the most efficient equipment must be shut down to allow the higher capacity second stage equipment to operate.

In a first embodiment of a duct-connected system, the portable geothermal unit—with its own portable electrical and water supply connections—is introduced into the home heating system independently of the existing furnace. In this first embodiment the unit is self-ducted in a stand-alone fashion to ductwork in a first room or location within the structure, for example in a basement or utility room, the ductwork venting to a different room or location.

In a second embodiment of a duct-connected system, the geothermal unit may be attached to the supply side of an existing conventional forced-air space conditioning system ("furnace") by ductwork, while drawing air from its surroundings.

In a third embodiment of a duct-connected system, the geothermal unit may be integrated with the existing furnace and ductwork system so as to both draw air from, and supply air to, only the areas of the home already served by the existing ductwork. In this third embodiment, a means of preventing short-circuiting of air inside the duct system is provided, in one form a backdraft damper installed in the furnace supply side, upstream of the geothermal unit's supply connection to the furnace ductwork.

"Home" or "house" is generally used herein to include both residential and non-residential/commercial buildings and their associated wells, furnaces, ductwork, water and electrical connection points, although the compact, portable nature of the geothermal heating unit tends to lend itself best to smaller, residential applications.

"Existing" is generally used herein to refer to the independently installed home heating, electrical, and water supply/discharge systems and the like that will typically exist prior to the installation and connection of the geothermal heat pump unit. However, it may also include homes and related heating, electrical, and water supply/discharge systems and connection points that are built or installed concurrently with the inventive geothermal heat pump unit, including those installed with the intention of being connected to or combined with the geothermal heat pump unit.

"Heating" is generally used herein to include both heating and cooling installations and operations, to avoid a cumbersome use of both terms every time the operation of the unit is described. Where a heating operation is specifically described, it should be understood that those skilled in the art are readily capable of converting the unit (and any furnace system with which it is combined) to a cooling application by reversing air and water flows and the operation of condensers and evaporators in known manner. "Furnace" is used herein as shorthand for the existing forced-air type heating (and cooling) unit in a home, usually fossil fuel or electric. The portable geothermal heat pump unit is intended to replace the primary heating and cooling source, assigning the existing furnace to a supplemental role.

These and other features and advantages of the invention will become apparent from the detailed description below, in light of the accompanying drawings.

DETAILED DESCRIPTION

Figure 1:
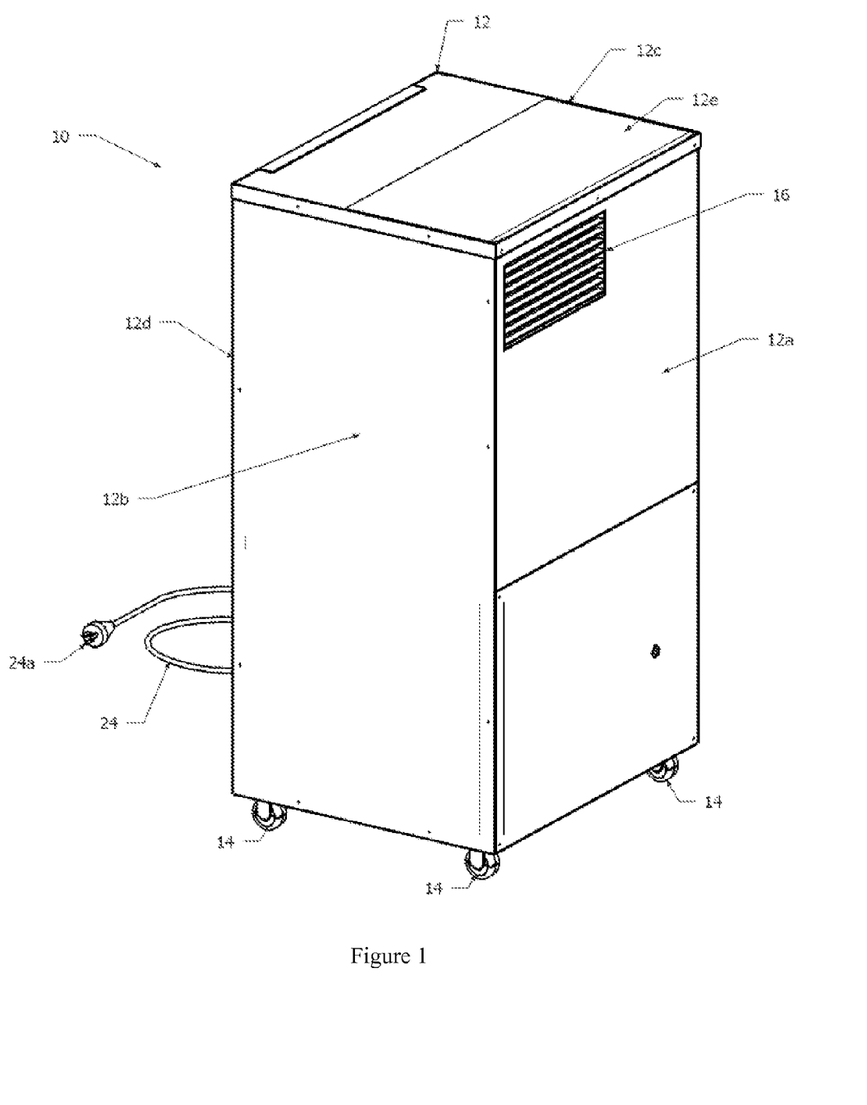
FIG. 1 is a front perspective view of a portable, stand-alone geothermal heating unit according to the invention.
Figure 2:
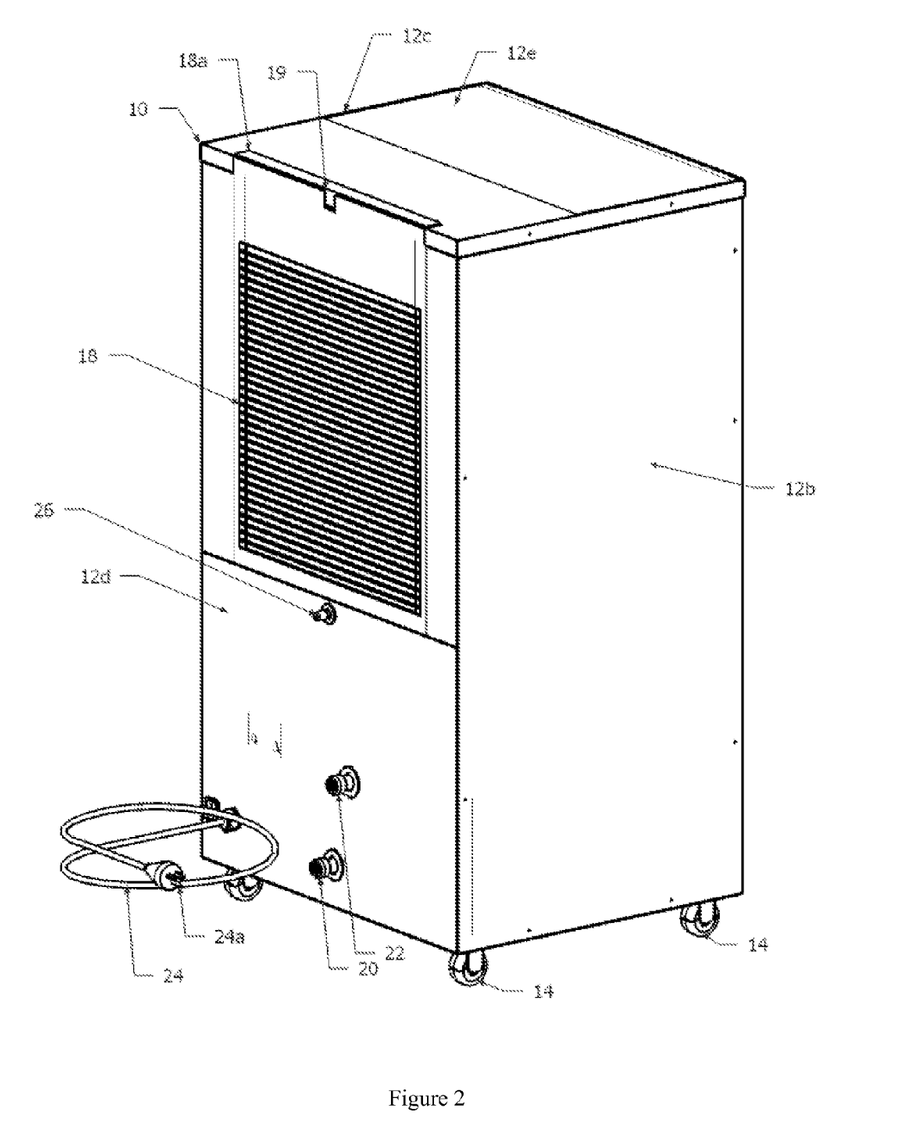
FIG. 2 is a rear perspective view of the geothermal heating unit of FIG. 1.

Referring first to FIGS. 1 and 2, a portable geothermal heat pump unit 10 contained in a cabinet 12 is shown in exemplary and currently preferred form in order to teach how to make and use the claimed invention.

By "portable" we mean a non-fixture unit capable of being installed, uninstalled, and moved by one or more persons between different installation points in a home, without having to make essentially permanent hard-piped and hard-wired plumbing and electrical connections (such as soldered copper pipe, glued PVC tubing connections, dedicated electrical wiring and circuits) to the unit 10. Although not limited to a particular set of dimensions, unit 10 is preferably of a size to be moved through existing doorways in a home, and in the illustrated example has dimensions of approximately 24-inches wide, 22-inches deep, and 44-inches high. To increase portability, unit 10 may be provided with wheels or casters 14 so that it may be wheeled from one location to another in the home. In the illustrated example, the unit 10 is rated at 18,000 btus and 1.5 tons in terms of heating capacity.

Portable geothermal heat pump unit 10 is adapted to use existing, "open" or non-dedicated water supply/discharge points in the home, themselves already connected to receive water from a well and to discharge water to an outdoor drain location such as a ditch, well pit, or other site-specific wastewater discharge location compatible with the well. Such open water connection points include but are not limited to sink faucets, general utility faucets, and valve-handle spigots for supply; and drains (such as those found in floors, sinks, or tubs), drain lines (such as used for washing machines), and sumps, for open-loop discharge through the house grey-water system to an outside discharge location. The open water supply and discharge connection points may be already existing in the home for other purposes, or may be specially installed for connection to unit 10—for example by branching a faucet line off an existing water line in the house, if no convenient faucet or spigot is available in the desired location. In the case of specially installed water supply/discharge lines and connection points, however, their open or non-dedicated nature allows them to be left in place and even used for other purposes if the geothermal heat pump unit 10 is later moved to another location in the home.

Geothermal heat pump unit 10 is also adapted to use existing, "open" electrical supply outlets with a simple plug connection, in the illustrated example a three-terminal 222 VAC outlet, but capable of using home outlets delivering 110 VAC or other voltages depending on the size of the unit 10, its heating capacity/requirements, and the efficiency and voltage of the compressor used in the unit. Again, since the electrical connection between unit 10 and the house electrical supply is through an open, non-dedicated outlet, the outlet may be used for other purposes if the unit 10 is moved to another location.

Example heat pump unit 10 is contained in a portable cabinet 12, for example made from sheet metal or durable polymer, with front 12a, sides 12b and 12c, rear 12d, and top 12e. The cabinet may take any shape and have different decorative appearances, and is not limited to the rectangular shape and appearance shown. Front panel 12a includes a supply vent 16 for delivering heated air directly to the surrounding room. Rear panel 12d includes an air intake vent 18 for drawing cold air directly from the surrounding room, and in the illustrated example also includes a slot 18a for a removable air filter 19 associated with intake vent 18. The rear panel 12d also includes openings for a water supply inlet 22 accessible from the exterior of the cabinet, a water discharge outlet 20 accessible from the exterior of the cabinet, and an electrical power supply cord 24 with terminal plug 24a. A condensate overflow outlet 26 may also be accessible from the rear panel. It will be understood that while a male plug connector cord 24 is illustrated, the power supply could be a female plug on the end of a cord or otherwise accessible from the exterior of the cabinet.

Cabinet 12 not only contains and conceals all of the internal heat pump structure for unit 10, but also functions as an air plenum, particularly when unit 10 is operated in a standalone mode for direct room heating.

Figure 3:
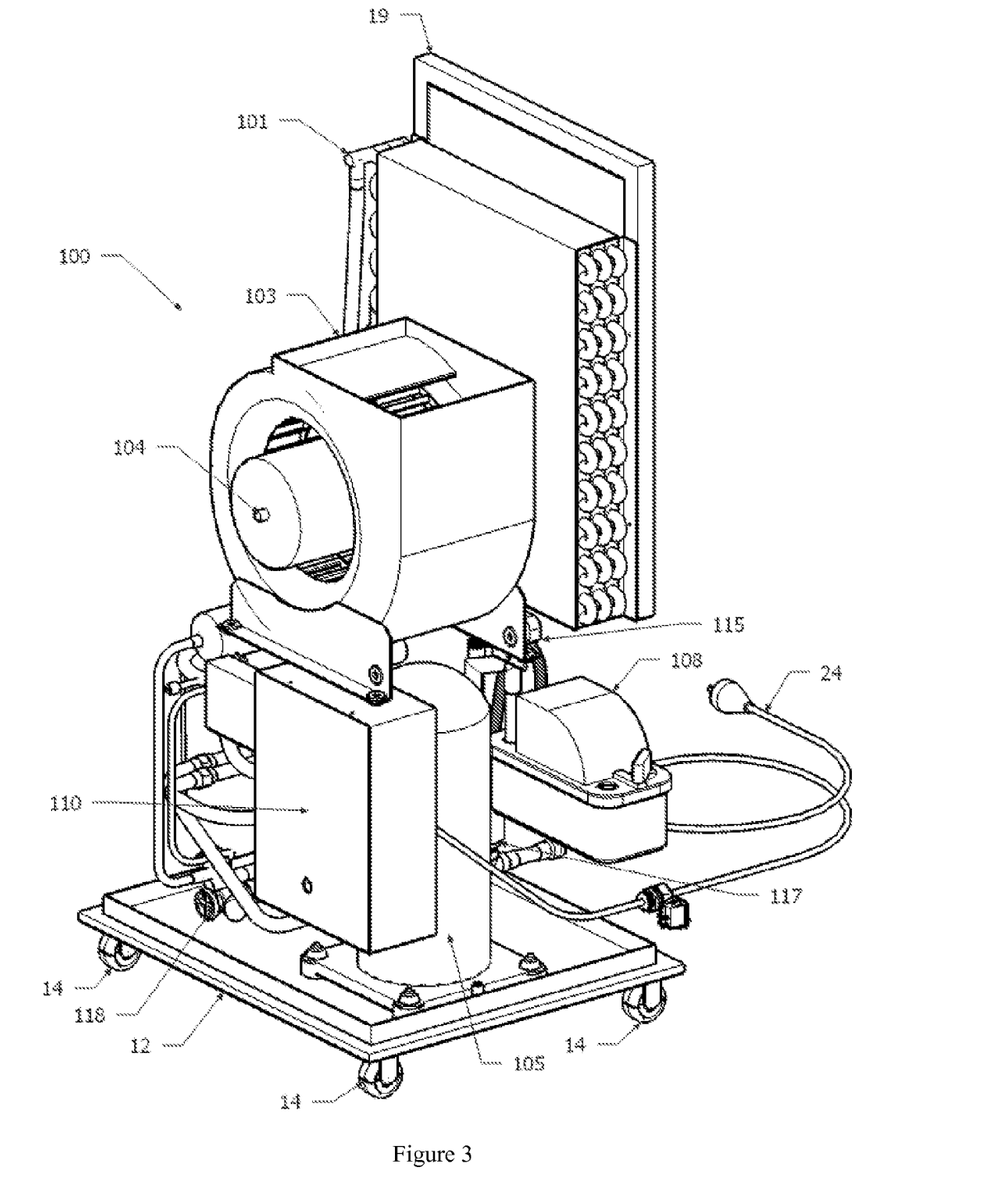
FIG. 3 is a left front perspective view of the geothermal heating unit of FIG. 1, with exterior panels of the cabinet removed to show internal heat pump components.
Figure 4:
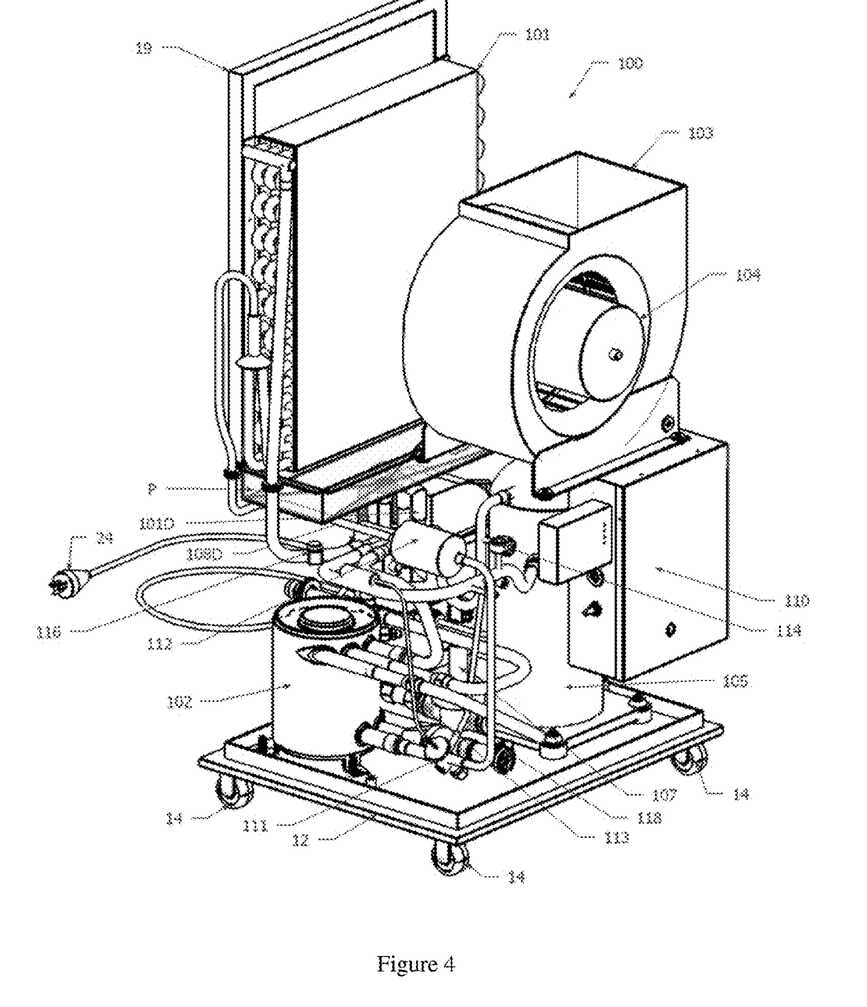
FIG. 4 is a right front perspective view of the geothermal heating unit of FIG. 1, with exterior panels of the cabinet removed to show internal heat pump components.

FIGS. 3 and 4 illustrate a currently preferred example of a heat pump apparatus 100 used in unit 10, fully contained inside the cabinet except for the above-mentioned water supply and discharge connections 22 and 20 and the power supply cord 24. Heat pump 100 is essentially conventional in construction and function, except for having been sized to fit in a compact portable cabinet 12. Accordingly, the structure and operation of heat pump 100 will be generally known to those skilled in the art, and the selection and arrangement of components may vary.

For reference purposes, the major components of illustrated heat pump 100 will be described. Heat pump 100 includes an air coil 101 that allows the transfer of heat energy between a refrigerant circulated in the coil and room air, and functions essentially as a radiator. A water coil 102 allows transfer of heat energy between the refrigerant passing through the water coil and well water received from supply inlet 22. A blower 103 powered by a blower motor 104 draws air across the air coil 101 through intake vent 18 and expels the heated air out of unit 10 through supply vent 16.

A compressor 105 draws in vaporized refrigerant and discharges it under a higher temperature and pressure. A reversing valve 106 directs hot, compressed refrigerant vapor from the compressor 105 to either the air coil 101 or the water coil 102, depending on the operating mode (heating or cooling, respectively); reversing valve 106 also directs cool, low pressure vapor back to the compressor 105.

A water valve 107 opens to allow water flow during unit operation, and shuts to stop water flow when the unit is off. A condensate pump 108 collects condensate water from the air coil 101 via illustrated drain line 101D and periodically expels it into the discharge water line 20 via illustrated drain line 108D. A condensate pan P may be located intermediate the air coil 101 and condensate pump 108, connected to lines 101D and 108D.

Figure 9:
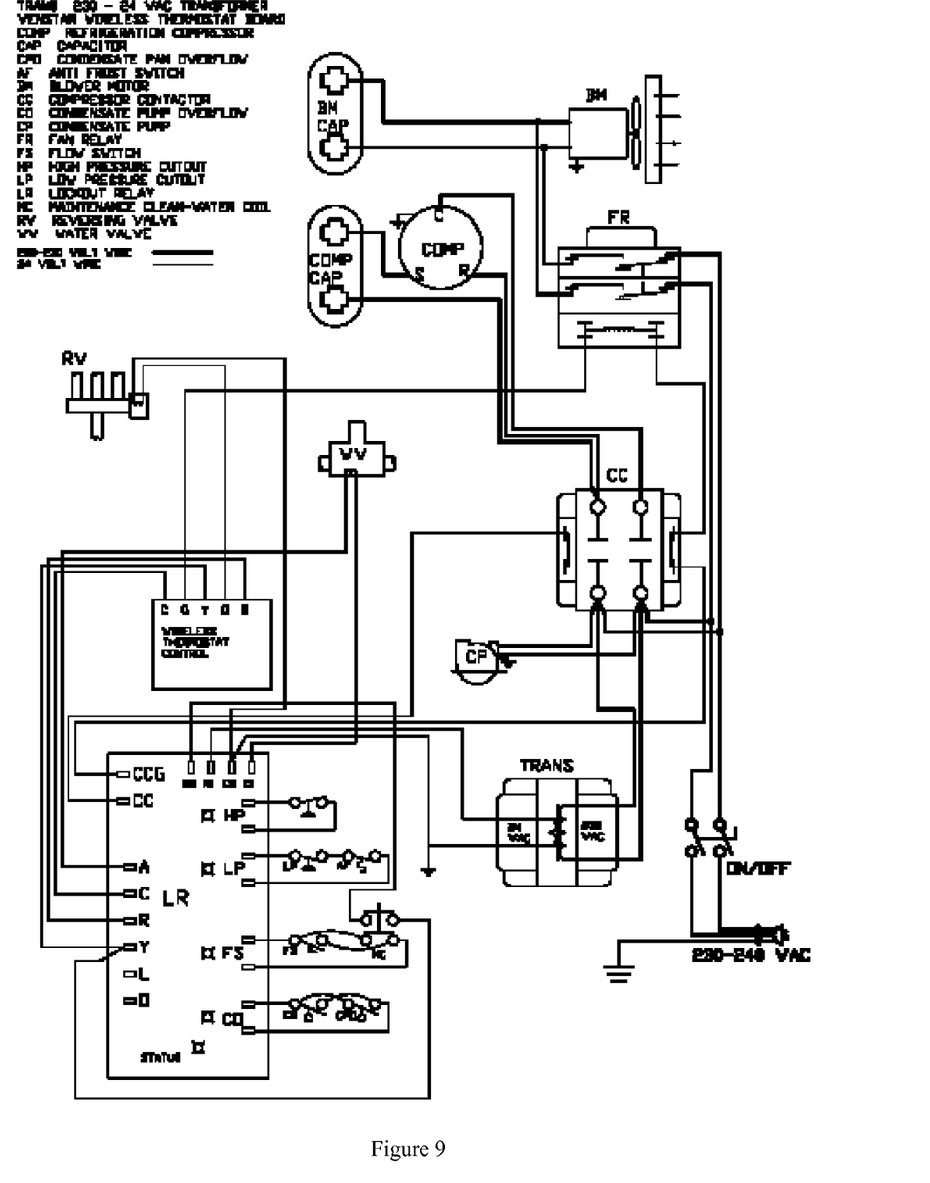
FIG. 9 is an electrical schematic of an example electrical control board/control box, and the heat pump components controlled thereby, in the geothermal heating unit of FIGS. 1-8.

An electrical control box 110 contains all high voltage components as well as low voltage system controls, illustrated schematically in FIG. 9, which operate and regulate the valves, compressor, blower, thermostats, switches, and other electrical or electromechanical devices in heat pump 100.

An expansion valve 111 meters liquid refrigerant so as to maintain one side of the system at a high pressure and the other at a low pressure, detects refrigerant operating conditions via remote pressure line and thermobulb, and adjusts accordingly. A filter drier 112 traps and removes moisture and particulate contaminants from the refrigerant stream. A flow control 113 automatically adjusts to allow a fixed rate of water flow across a wide range of water supply pressures supplied to inlet 22 from a well. Pressure switches 114 interrupt a circuit if refrigerant pressures exceed (high pressure) or drop below (low pressure) predetermined values, sending inputs to the control board in 110 to trigger a shutdown.

Condensate overflow switches 115 connect a circuit if condensate water rises above a set level in the condensate pan P or the condensate pump, sending an input to the control board in 110 to trigger a shutdown. An anti-frost switch 116 interrupts a circuit if a sub-freezing condition is detected on the air coil vapor line, sending an input to the control board in 110 to trigger a shutdown. A check valve 117 prevents water from flowing back from the discharge line into the condensate pump. A drain valve 118 allows water to be drained from the water coil for storage or maintenance.

Open-loop water source heat pumps are sometimes prone to developing mineral deposits in the water coil over prolonged use, depending on the mineral content of the source well. In a preferred form, the water coil heat exchanger 102 can be subjected to a freeze cycle to flush out mineral deposits. When the water coil is drained, the tubing in the coil is frozen by holding down a compressor-activating override switch until the water coil freezes, and then fresh water is run through the tubing to flush out any frozen mineral deposits.

Figure 5A:
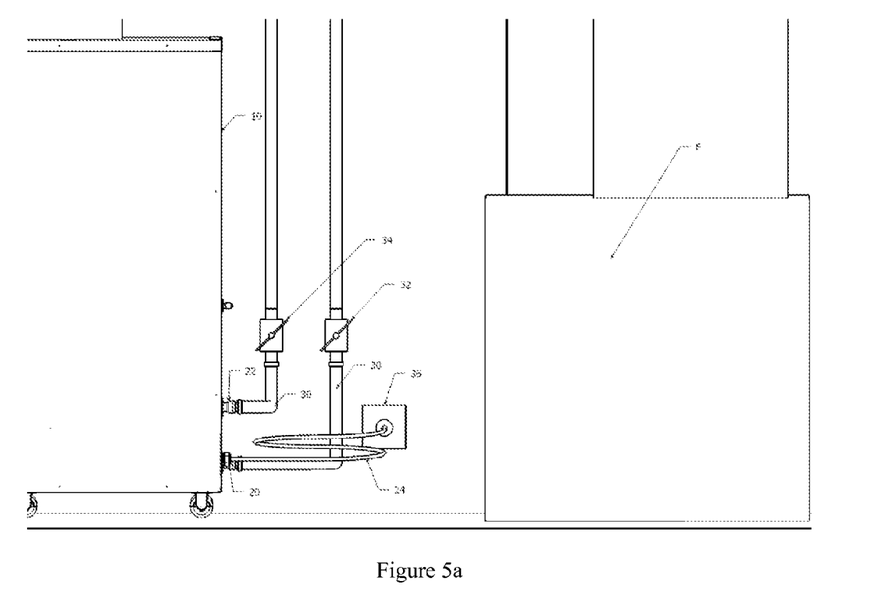
FIG. 5a is a side elevation view of the geothermal heating unit of FIG. 1 connected to well water and electrical supply connections in a house.
Figure 10:
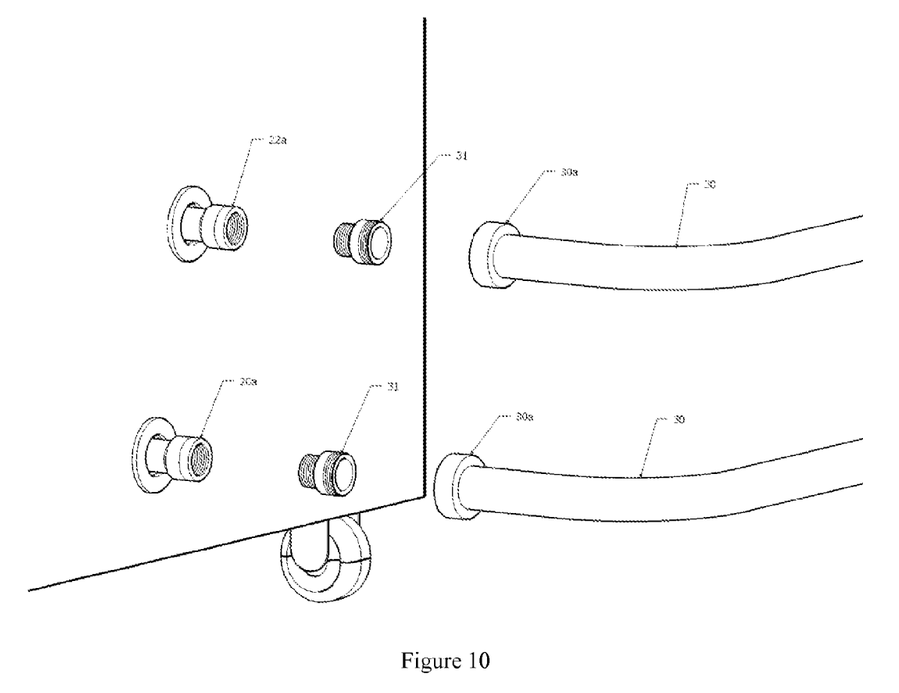
FIG. 10 is a detail exploded view of a currently preferred watertight connection between the water inlet and outlet on the heat pump unit and hoses from home water supply and discharge connection points.

FIG. 5a schematically illustrates a basic, standalone installation of heat pump unit 10 for direct room heating in a home, independently of any existing furnace F. Unit 10 is detachably connected by soft hose or tubing 30 in a non-permanent fashion to home water supply point 34 (e.g., a faucet with hand-operated valve) and home water discharge point 32 (e.g., a drain line with hand-operated valve). The connections between the hoses 30 and the water supply and discharge points 22, 20 and 34, 32 can be made in any known non-permanent, non-plumbed, watertight fashion, including but not limited to using hose clamps, or with male/female threaded hose fittings like those used in garden hoses, washing machine hook-ups, and the like. For this purpose, and as best shown in the detail view of FIG. 10, the exposed ends of water inlet 22 and water outlet 20 on unit 10 may be provided with threaded ends and/or threaded adapters 22a and 20a, in the illustrated example with an intermediate nipple fitting 31, and mating watertight connectors or fittings 30a on the ends of hoses 30. Alternately, the ends of inlet and outlet 22 and 20 may be sized and shaped to accept hoses and hose clamps in a watertight fit. In general, any non-plumbed connection currently used in homes for connecting portable/non-fixture water-using devices (e.g., washing machines and dishwashers) to home water supply and discharge lines should be suitable for connecting unit 10. It will also be understood that "hose" 30 should be construed broadly, and can include most water supply hose or tubing, of any material, capable of non-plumbed connection from home supply and discharge points to portable water-using devices.

FIG. 5a also shows unit 10 connected by its power cord 24 to a 222-vAC electrical outlet 36 in a wall of the room. All power needed by unit 10 may be supplied by a single outlet 36 using a single cord 24.

It will be understood in FIG. 5a that home water supply and discharge points 34 and 32 are connected respectively to a groundwater well 40 and an outdoor discharge location 50 (best shown in FIGS. 6 through 8) associated with the home. Well 40 may be any type of groundwater well wherein the water supplied is of fairly constant temperature. Discharge location 50 may be any site-specific outside location suitable for receiving a fairly continuous stream of discharge water (e.g., on the order of two gallons per minute) that unit 10 produces during operation; this may include ditches, ponds, shallow well pits, non-septic drain fields, and others.

Figure 5B:
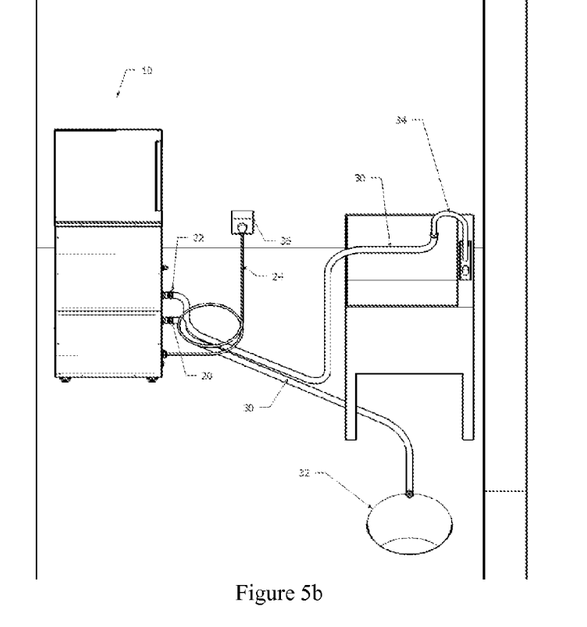
FIG. 5b is a perspective view of the geothermal heating unit of FIG. 1, with an alternate connection to well water and electrical supply connections in a house.

FIG. 5b represents an alternate hose connection between unit water supply and discharge points 22, 20 and a sink-based faucet 34' and a floor drain 32'. These are only examples of possible connections, and are not intended to be limiting.

Figure 6:
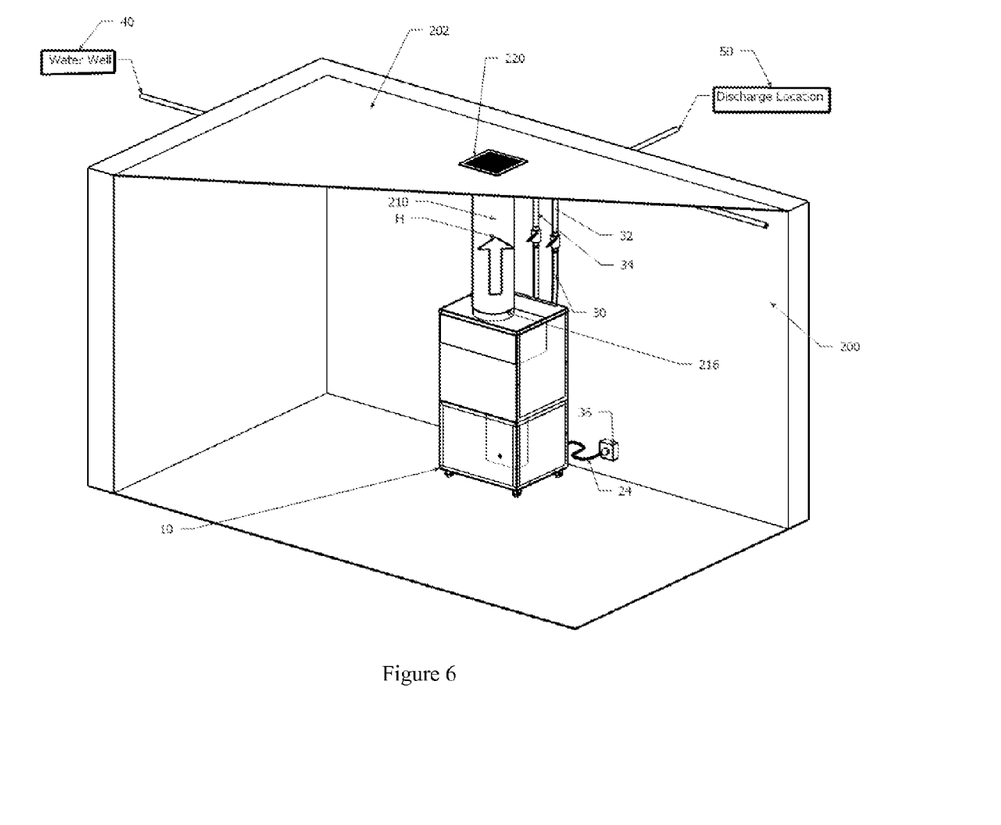
FIG. 6 is a schematic representation of the geothermal heating unit of FIG. 1 connected in a first combination with air supply ductwork to heat a different room in a home.

FIG. 6 schematically represents a first "duct-connected" installation of geothermal heat pump unit 10 in a first room 220 of a home, where unit 10 is modified with a duct supply collar or similar duct connection 216, instead of or in addition to direct supply vent 16 shown in earlier Figures, for connection to a duct 210 for delivering heated air H to a vent 222 in another room or location 222 of the home. Unit 10 is connected via hoses 30 or equivalent to home water supply and discharge points 34, 32 in room 220 as described above, and powered with a simple plug connection 24 to an electrical outlet 36 in room 220 as described above, and draws its cold air directly from the room 220 in which it is installed through intake vent 18 as described above. The duct-connected example of FIG. 6 may be installed using an existing duct 210 and vent 222, or a duct 210 and vent 222 may be installed for use with unit 10.

Figure 7:
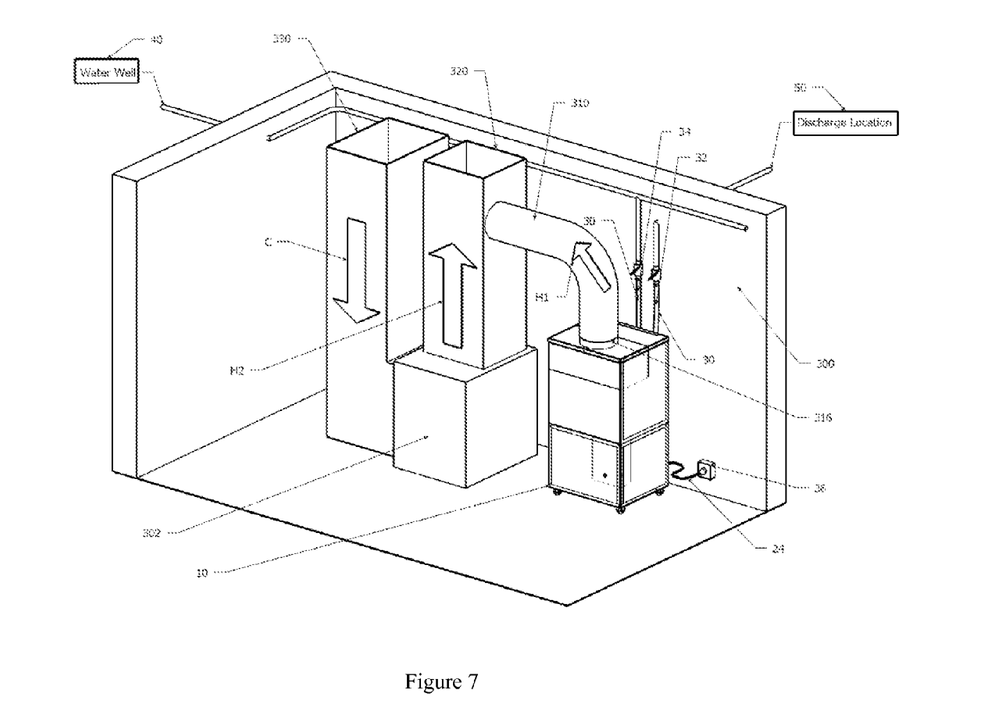
FIG. 7 is a schematic representation of the geothermal heating unit of FIG. 1 connected in a second combination with an existing forced air furnace system's supply ductwork to heat other rooms in a home.

FIG. 7 shows a second duct-connected installation of unit 10, in which the unit operates in duct-connected parallel with an existing home furnace 302 in a room 300. Duct connection 316 on unit 10 is connected by a supply duct 310 to the supply side 320 of furnace 302, for example to the supply plenum although other locations may be possible. Heated air H1 from unit 10 enters the supply system 320 of furnace 302 to be distributed to other rooms in the home through the existing furnace ductwork, driven by the blower in unit 10, optionally supplemented by the blower in furnace 302 and heated furnace air H2 depending on the home's heating requirements.

Geothermal heat pump unit 10 in FIG. 7 is connected via hoses 30 or equivalent to home water supply and discharge points 34, 32 in room 300 as described above, and powered with a simple plug connection 24 to an electrical outlet 36 in room 300 as described above, and draws its cold air directly from the room 300 in which it is installed through intake vent 18 as described above. Furnace 302 is fueled and powered in conventional fashion, and receives its combustion (if fossil-fueled) and cold return air in conventional fashion, for example by direct vent and/or cold air return duct system 330 drawing from other rooms in the home.

In a preferred operation of the duct-connected installation of FIG. 7, unit 10 is operated as the primary heating apparatus for the home, with furnace 302 operated only if and when additional heating is needed. Unit 10 and furnace 302 can also run at the same time in the duct-connected installation of FIG. 7, supplying heated air through the same supply duct system 320.

Figure 8:
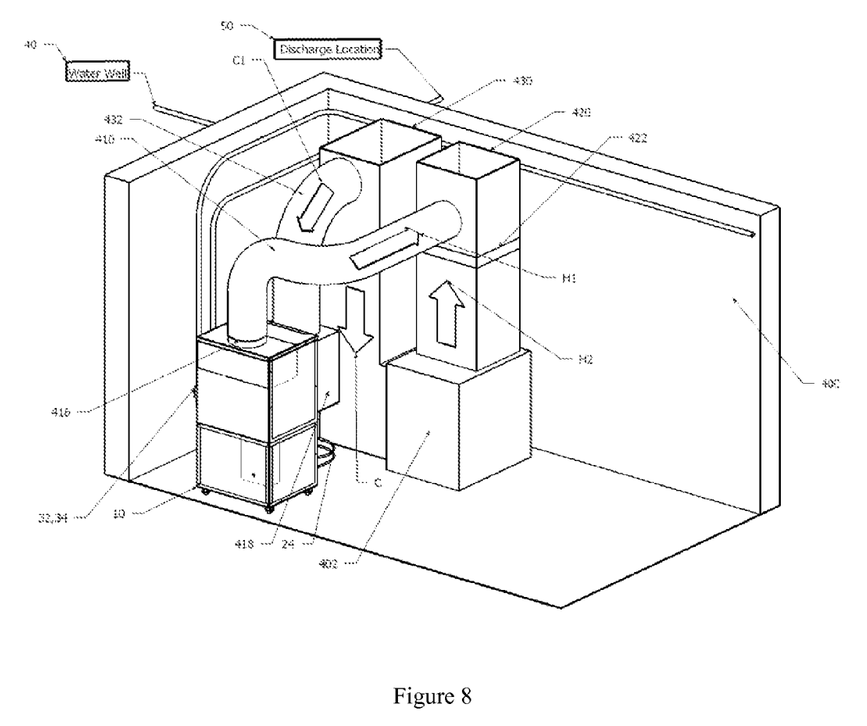
FIG. 8 is a schematic representation of the geothermal heating unit of FIG. 1 connected in a third combination with an existing forced air furnace system's supply ductwork to heat other rooms in a home.
Figure 8A:
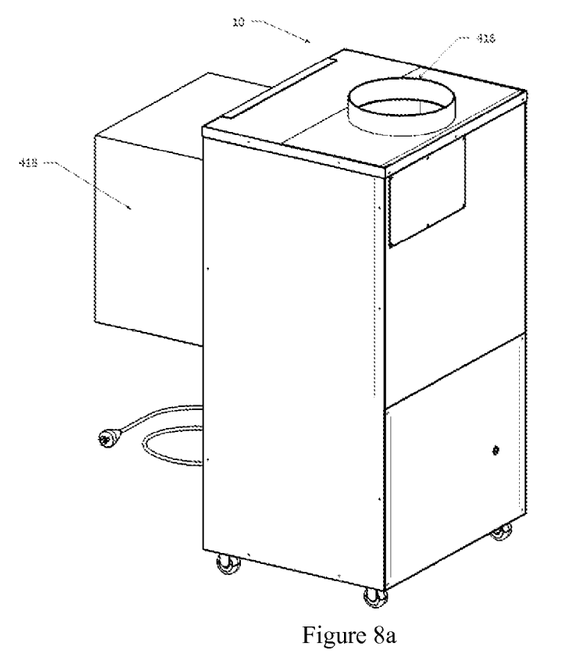
FIGS. 8a and 8b are front and rear perspective views of the geothermal heating unit of FIG. 8, modified for a connection to the existing furnace ductwork.
Figure 8B:
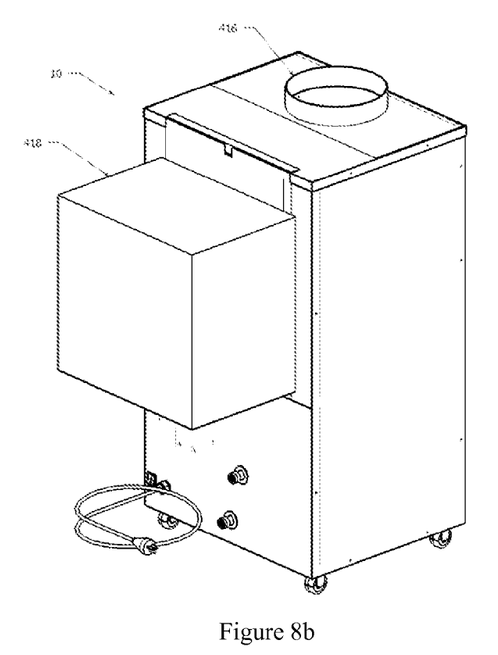

FIG. 8 represents a third duct-connected installation of geothermal heat pump unit 10, in which the unit 10 also operates in duct-connected parallel with an existing home furnace 402 in a room 400. Duct connection 416 on unit 10 is connected by a supply duct 410 to the supply side 420 of furnace 402, for example to the supply plenum although other locations may be possible. Heated air H1 from unit 10 enters the supply system 420 of furnace 402 to be distributed to other rooms in the home through the existing furnace ductwork, driven by the blower in unit 10, optionally supplemented by the blower in furnace 402 and heated furnace air H2 depending on the home's heating requirements.

The duct-connected installation of FIG. 8 differs from that in FIG. 7 primarily in the supply of cold air C1 to unit 10 via the existing return side 430 of the furnace, in the illustrated example via a duct connection 434 from the furnace's cold air return to a plenum box 418 added to the rear of unit 10 over the air intake vent 18. For times when furnace 402 is not delivering heated air into the supply side plenum/ductwork 420, a means 422 is provided for preventing backflow or short-circuiting of heated air from the unit 10 that might flow back into the furnace, and ultimately back into unit 10 via the cold air duct 434. In the illustrated example, backflow-preventing means is provided in the form of a backdraft damper or other backflow-preventing control 422 in the supply side plenum 420 of the furnace, downstream of the furnace proper and upstream of the ducted connection 410 of unit 10 to the furnace supply plenum. Backdraft damper 422 remains biased to a closed condition, for example by gravity, blocking airflow into the furnace 402 from supply plenum 420 while unit 10 delivers heated air into the supply ductwork above the damper. If the furnace turns on and begins delivering heated air into supply side 420, backdraft damper 422 opens under pressure of the supply air H2 from the furnace, and H1 and H2 merge in the supply plenum 420 to jointly heat the home.

In the duct-connected installations of FIGS. 7 and 8, we describe the joint supply of heated air from unit 10 and furnaces 302/402 through common furnace ductwork as "parallel" operation, although the unit 10 is not fully vented/supplied with air independently of the furnace. In the installations of FIGS. 5 and 6, the unit 10 is vented or ducted independently of the existing home furnace, but might also be described as running in parallel since the furnace may be turned on to supplement the heat from unit 10 if unit 10 is not supplying enough heat to the home.

DESCRIPTION OF OPERATION

In operation, the geothermal heat pump unit 10 is moved to a room in the home, and connected to water supply and discharge points 34, 32 and an electrical outlet 36 via water inlet and outlet 22, 20 and plug 24. Unit 10 may then be run independently to directly heat a room or area of the home, as in FIG. 5, or connected to a duct to heat a different room as in FIG. 6, or it may be connected to a furnace to heat different portions of the home through the existing furnace ductwork as in FIGS. 7 and 8. Because the installation of unit 10 is non-permanent, with non-plumbed connections to non-dedicated water supply/discharge points and home electrical outlets, unit 10 may be moved to different locations in the home as needed.

It will finally be understood that the disclosed embodiments represent presently preferred examples of how to make and use the invention, but are intended to enable rather than limit the invention. Variations and modifications of the illustrated examples in the foregoing written specification and drawings may be possible without departing from the scope of the invention. To the extent that the term "invention" is used in the written specification, it is not to be construed as a limiting term as to number of claimed or disclosed inventions or discoveries or the scope of any such invention or discovery, but as a term which has long been conveniently and widely used to describe new and useful improvements in science and the useful arts. The scope of the invention should accordingly be construed by what the above disclosure teaches and suggests to those skilled in the art, and by any claims that the above disclosure supports in this application or in any other application claiming priority to this application.

What is claimed is:

1. In a home comprising an existing open home water supply outlet connected to a groundwater well and adapted to supply water to people or devices in the home without a plumbed connection, an existing open home water discharge means adapted to receive discharge water from devices in the home without a plumbed connection and to deliver the discharged water to an open water discharge location associated with and outside the home, a portable geothermal heat pump apparatus comprising:

a water source heat pump in a portable cabinet, the heat pump comprising a water supply inlet accessible from an exterior of the cabinet and connected to the existing open home water supply outlet through a non-plumbed fluid supply connection; a water discharge outlet accessible from the exterior of the cabinet for discharging water from which heat energy has been extracted or added by the heat pump, the water discharge outlet connected to an existing open home water discharge means through a non-plumbed fluid discharge connection; and an electrical plug connected to a home electrical outlet, wherein the home comprises an existing forced-air heating system comprising a furnace in a first room and ductwork connections to at least one heating vent and at least one cold air return vent in at least one other room, and wherein the portable geothermal heat pump unit comprises a ducted heat supply connection to an air supply portion of the furnace and a direct air intake vent in direct air-to-air communication with the first room.

2. In a home comprising an existing open home water supply outlet connected to a groundwater well and adapted to supply water to people or devices in the home without a plumbed connection, an existing open home water discharge means adapted to receive discharge water from devices in the home without a plumbed connection and to deliver the discharged water to an open water discharge location associated with and outside the home, a portable geothermal heat pump apparatus comprising:

a water source heat pump in a portable cabinet, the heat pump comprising a water supply inlet accessible from an exterior of the cabinet and connected to the existing open home water supply outlet through a non-plumbed fluid supply connection; a water discharge outlet accessible from the exterior of the cabinet for discharging water from which heat energy has been extracted or added by the heat pump, the water discharge outlet connected to an existing open home water discharge means through a non-plumbed fluid discharge connection; and an electrical plug connected to a home electrical outlet, wherein the home comprises an existing forced-air heating system comprising a furnace in a first room and ductwork connections to at least one heating vent and at least one cold air return vent in at least one other room, and wherein the portable geothermal heat pump unit comprises a ducted heat supply connection to an air supply portion of the furnace and a ducted air intake connection to a furnace cold air return in the first room, and the system further comprising a backflow preventing control in the air supply portion of the furnace downstream of the furnace and upstream of the ducted heat supply connection of the geothermal heat pump unit to the air supply portion of the furnace.

3. The combination of claim 2, wherein the backflow preventing control is a gravity biased backdraft damper biased to a closed condition if the furnace is not supplying air to the air supply portion.

4. In a home comprising an existing open home water supply outlet connected to a groundwater well and adapted to supply water to people or devices in the home without a plumbed connection, an existing open home water discharge means adapted to receive discharge water from devices in the home without a plumbed connection and to deliver the discharged water to an open water discharge location associated with and outside the home, the home further comprising an existing forced-air heating system comprising a furnace in a first room and ductwork connections to at least one heating vent and at least one cold air return vent in at least one other room, a method of operating the forced-air heating system and a geothermal heat pump apparatus, the method comprising:

providing a portable geothermal heat pump apparatus comprising a water source heat pump in a portable cabinet, the heat pump comprising a water supply inlet accessible from an exterior of the cabinet and connected to the existing open home water supply outlet through a non-plumbed fluid supply connection; a water discharge outlet accessible from the exterior of the cabinet for discharging water from which heat energy has been extracted or added by the heat pump, the water discharge outlet connected to an existing open home water discharge means through a non-plumbed fluid discharge connection; and an electrical plug connected to a home electrical outlet, the portable geothermal heat pump unit further comprising a ducted heat supply connection to an air supply portion of the furnace and one of (a) a direct air intake vent in direct air-to-air communication with the first room or (b) a ducted air intake connection to a furnace cold air return in the first room; and, operating the portable geothermal heat pump apparatus and the forced-air heating system to deliver heated air to the air supply portion of the furnace from the heat pump and the furnace at the same time.

5. The method of claim 4, further comprising providing a backflow preventing control in the air supply portion of the furnace downstream of the furnace and upstream of the ducted heat supply connection of the geothermal heat pump unit to the air supply portion of the furnace.

\* \* \* \* \*